United States Patent
Mendez et al.

(10) Patent No.: US 6,467,065 B1
(45) Date of Patent: Oct. 15, 2002

(54) MASTER/SLAVE CONTROL SYSTEM AND METHOD

(75) Inventors: Victor Mendez, Kokomo, IN (US); Christopher A. Lupini, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/354,126

(22) Filed: Jul. 9, 1999

(51) Int. Cl.[7] .............................................. G06F 11/10
(52) U.S. Cl. ........................ 714/800; 714/52; 714/18; 710/31
(58) Field of Search ....................... 714/18–21, 48–52, 714/712, 746–749, 800–805, 821; 710/29–32

(56) References Cited

U.S. PATENT DOCUMENTS

| | | | | |
|---|---|---|---|---|
| 3,646,580 A | * | 2/1972 | Fuller et al. ................ | 455/524 |
| 3,790,769 A | * | 2/1974 | Ziegler ...................... | 714/803 |
| 4,751,633 A | * | 6/1988 | Henn et al. .................. | 714/18 |
| 5,278,848 A | * | 1/1994 | Yamaguchi ................ | 714/800 |
| 5,453,999 A | * | 9/1995 | Michaelson et al. ........ | 714/805 |
| 6,021,308 A | * | 2/2000 | Kimura ...................... | 455/6.3 |

* cited by examiner

*Primary Examiner*—Christopher B. Shin
(74) *Attorney, Agent, or Firm*—Jimmy L. Funke

(57) ABSTRACT

A master/slave control system and method of communicating messages between a master controller and slave devices, especially for use in a vehicle. The system includes a data communication bus, a plurality of slave devices coupled to the data communication bus which are addressable and capable of reading messages broadcast on the data communication bus and broadcasting reply messages to the data communication bus, and a master controller coupled to the data communication bus for broadcasting command messages. The command messages include an address for addressing at least one of the plurality of slave devices and a direction indicator parity bit for identifying the command message. The addressed slave device produces a reply message which includes a reply direction indicating parity bit for identifying the reply message.

19 Claims, 3 Drawing Sheets

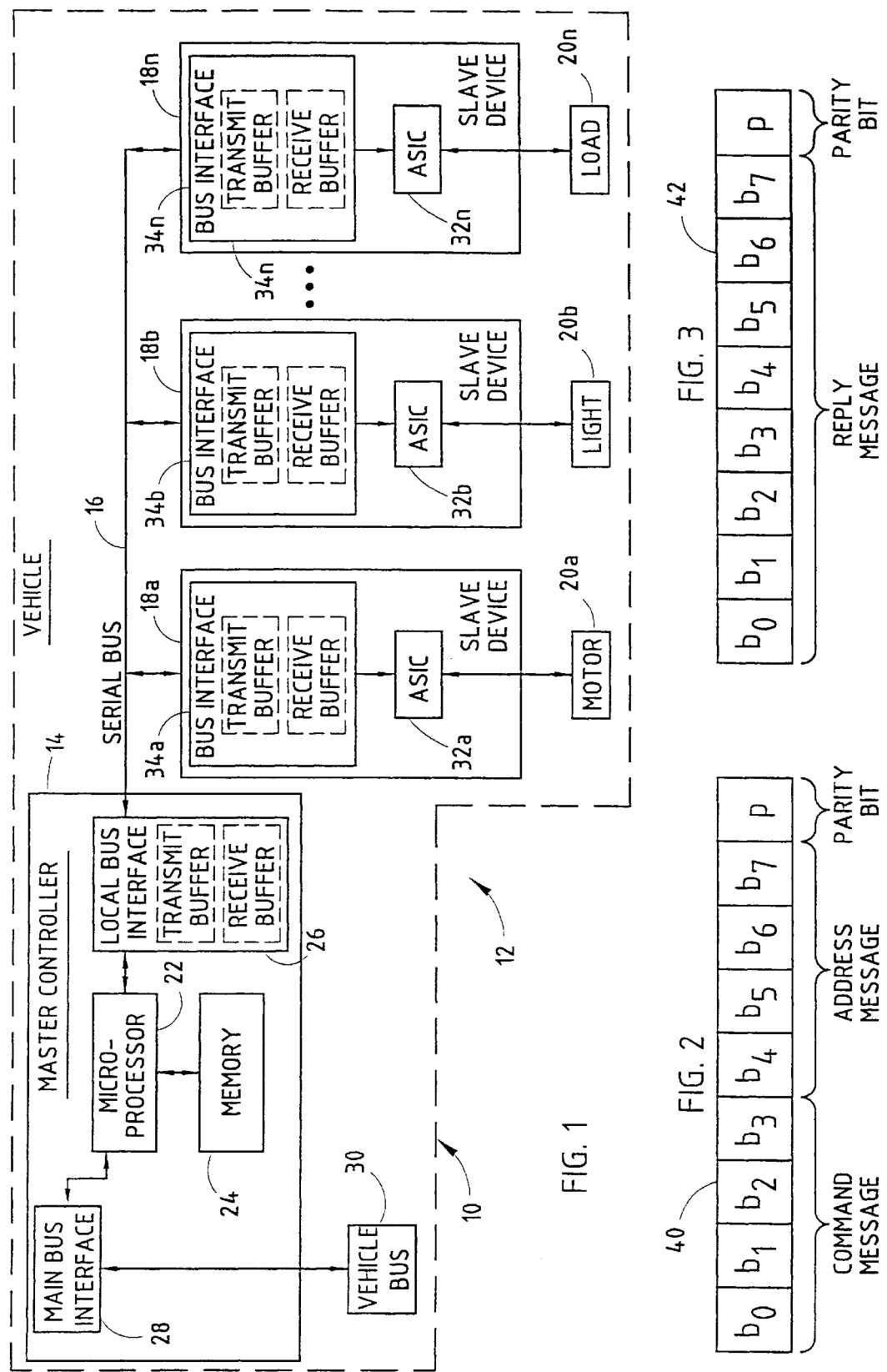

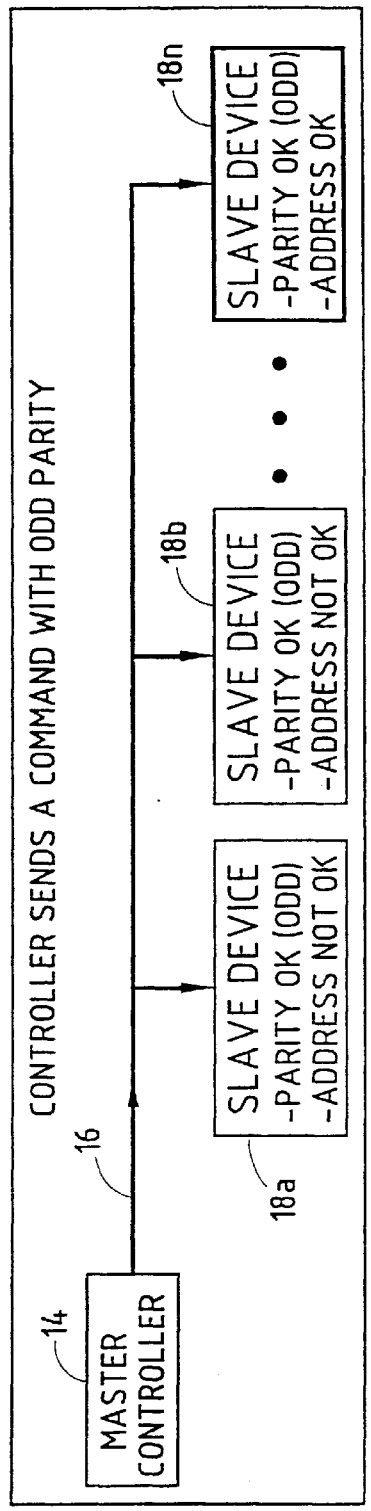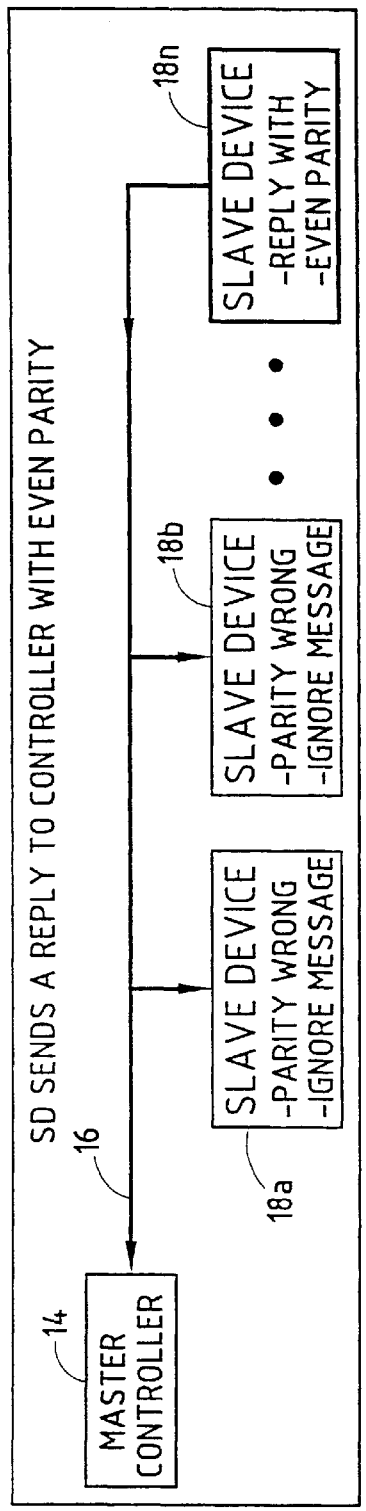

MASTER/SLAVE CONTROL SYSTEM AND METHOD

TECHNICAL FIELD

The present invention generally relates to data, communication in a control system and, more particularly, relates to a master/slave control system and method for communicating data between a master controller and slave devices.

BACKGROUND OF THE INVENTION

Modern automotive vehicles commonly employ various control systems equipped with electronic devices for controlling vehicle-related operations. For example, automotive vehicles are conventionally equipped with an engine control module (ECM) for controlling engine related operations, and a body controller generally for controlling electronic devices such as window motors, seat motors, headlamps, instrument panel electronics, etc. Many of the controllers in a vehicle are typically interconnected by way of a data communication bus which allows for the sharing of data amongst the various control systems.

In addition, some of the vehicle controllers communicate with lower level electronic devices, which are generally less sophisticated, in what is known as a master/slave control system. In the master/slave control system, the controller is commonly referred to as the master controller, while the lower level electronic devices are commonly referred to as slave devices. The master controller is typically connected via a serial data communication bus to a plurality of slave devices such that the master controller sends command messages to the slave devices to execute designated operations.

In the typical master/slave vehicle control system, the master controller typically broadcasts a command message with a unique address to the plurality of slave devices. Each slave device reads the command message and determines whether or not it has been addressed and, if so, performs the commanded function. In turn, the addressed slave device typically replies with a reply message that is broadcast on the data communication bus and is intended to be read by the master controller to provide feedback information such as fault and status information pertaining to the slave device. According to the conventional approach, the contents of both the command and reply messages require a certain number of bits dedicated to addressing the slave device.

In addition, the serial data bits associated with the command and reply messages may contain a parity bit with odd or even parity for the purpose of message validation. The parity bit generally includes either a binary "0" or a binary "1" and is selected to provide the message with an overall odd or even parity. That is, the total accumulated bits in the message, including the parity bit, will sum together to provide either an odd or an even number of binary "1s." The parity bit is selected to provide either an odd or an even parity to indicate that the message is a valid message.

According to the conventional vehicle master/slave control system, the command message includes a dedicated number of command bits, address bits, and the parity bit, while the reply message includes a dedicated number of feedback status information bits, address bits, and the parity bit. As a consequence, each slave device that is in data communication with the data communication bus reads and decodes every message that is broadcast on the data communication bus in order to determine whether or not the broadcast message is addressed to that corresponding slave device. The reply message generally contains dedicated address bits to inform the master controller which slave device is replying. According to this approach, each slave device typically reads and deciphers all reply messages to determine whether the message is directed to that corresponding slave device. It is therefore desirable to provide for a vehicle master/slave control system with enhanced data response, which more efficiently utilizes the bandwidth and reduces the reply message size.

SUMMARY OF THE INVENTION

According to the teachings of the present invention, a master/slave control system and method of communicating messages between a master controller and slave devices are provided. The system includes a data communication bus for communicating data messages. A plurality of slave devices are coupled to the data communication bus, and are addressable and capable of reading messages broadcast on the data communication bus and broadcasting reply messages to the data communication bus. A master controller is also coupled to the data communication bus for broadcasting command messages. The command messages include an address message for addressing at least one of the plurality of slave devices and a direction indicator parity bit for identifying the command message. The addressed slave device broadcasts a reply message which includes a reply direction indicating parity bit for identifying the reply message. The slave devices detect the parity of messages received and preferably ignore those messages identified as reply messages.

The master/slave control system and method of the present invention advantageously provides for reduction in size of the reply message, which leads to a faster system response and more efficient bandwidth utilization, while providing message validation. Accordingly, the present invention eliminates the need for dedicated addressing bits in the reply message.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1 is a block diagram illustrating a master/slave control system in a vehicle for communicating data according to the present invention;

FIG. 2 is a block diagram illustrating a command message broadcast by the master controller;

FIG. 3 is a block diagram illustrating a reply message broadcast by a slave device;

FIG. 4 is a block diagram illustrating the broadcasting of a command message in the master/slave control system according to the present invention;

FIG. 5 is a block diagram illustrating the broadcasting of a reply message in the master/slave control system according to the present invention.

DETAILED DESCRIPTION OF THE PREFERRED EMBODIMENT

Figure 6:
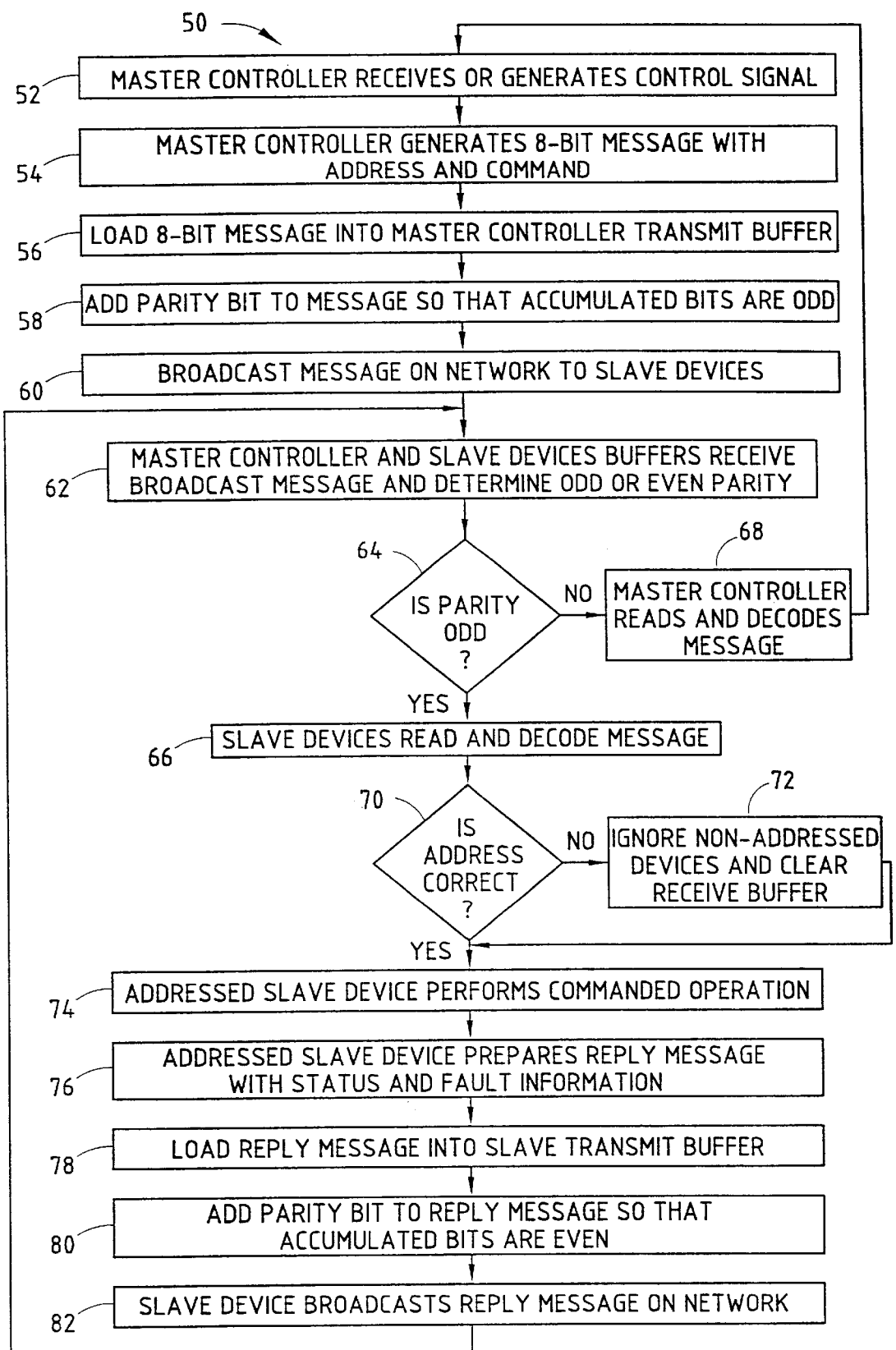
FIG. 6 is a flow diagram illustrating a method of communicating command and reply messages in the master/slave control system in a vehicle according to the present invention.

Referring to FIG. 1, an automotive vehicle is generally shown by block 10, and is equipped with a master/slave control system 12 connected to the vehicle's main data communication bus 30. The vehicle 10 may include a plurality of master/slave control systems, each preferably connected to the data communication bus 30. The master/slave control system 12 generally includes a master controller 14, a plurality of slave devices 18a–18n, and a serial data communication bus 16 in communication with the master controller 14 and each of the slave devices 18a–18n. In addition, the master controller 14 communicates with the vehicle's main serial data bus 30.

The main serial data bus 30 is generally connected to various control systems in the vehicle 10 and which may include the SAE J1850 Class II communication bus. Serial data communication bus 16 is a local network that provides data communication amongst the master controller 14 and each of the plurality of slave devices 18a–18n. The local data communication bus 16 and main data communication bus 30 may communicate serial data according to known communication protocols which may include but are not limited to pulse width modulation (PWM) or variable pulse width (VPW) coding. It should be appreciated that various types of master controller 14, slave devices 18a–18n, communication buses and communication protocols may be employed without departing from the spirit of the present invention.

The master controller 14 generally includes a microprocessor 22, memory 24, a main bus interface 28, and a local bus interface 26 with a transmit buffer and receive buffer. The main bus interface 28 is coupled to the vehicle's main data bus 30, while the local bus interface 26 is coupled to the local serial data bus 16. The transmit and receive buffers provided in the local bus interface 26 allow for the transmission and receipt of serial data on the local serial data bus 16. The master controller 14 may include any of a number of electronic control devices such as those found on a vehicle. For example, master controller 14 may include an engine control module for controlling engine-related operations, or a body controller for controlling motor-operated windows, powered-seats, and other electronic load devices.

The slave devices 18a–18n are generally less sophisticated remote controllers which perform one or more control operations in response to receiving a command message from the master controller 14. Each of slave devices 18a–18n is connected to a load, such as motor 20a and light 20b. In particular, slave device 18a controls motor 20a by turning motor 20a on or off in response to a command message. Likewise, slave device 18b controls light 20b, such as a vehicle headlamp, in response to a command message.

Slave devices 18a–18n include bus interfaces 34a–34n, respectively, each of which has a receive buffer and a transmit buffer. The receive buffer receives messages broadcast on local serial data bus 16, while the transmit buffer stores reply messages that are intended to be broadcast on local serial data bus 16. In addition, the bus interfaces 34a–34n allow for data communication with the local serial data bus 16. Further, each of the slave devices 18a–18n includes an application specific integrated circuit (ASIC) 32a–32n or other control circuitry. Each of the ASICs 32a–32n has processing capability to read and decode messages received at the receive buffer in the corresponding bus interface, and to perform a designated control operation, such as turning a motor or other designated load devices on or off. In addition, ASICs 32a–32n are able to monitor fault and status information pertaining to the motor or other load devices and to generate a reply message that is loaded in the transmit buffer for broadcasting on the data communication bus 16.

Accordingly, master controller 14 broadcasts a data command message on serial data bus 16 to each of slave devices 18a–18n. Each of the slave devices 18a–18n reads and decodes the message and determine whether that particular slave device is addressed by the address bits in the command message. If addressed, the corresponding slave device performs a designated control operation to control the load device associated therewith. In addition, the slave device monitors the status and fault information relating to the associated load device and generates a reply message for transmission back on the data serial communication bus 16. The master controller 14 thereafter reads the reply message.

Referring to FIG. 2, the command message 40 is illustrated therein according to one example. Command message 40 includes 8-bits $b_0$–$b_7$ and a parity bit p. In addition, the command message 40 may also include a conventional start bit (not shown) at the beginning of the message and a conventional stop bit (not shown) at the end of the message. According to the example shown, bits $b_0$–$b_3$ are dedicated to providing command information, while bits $b_4$–$b_7$ are dedicated to providing address information. The parity bit p is used to provide an odd or even parity to the overall command message 40 indicative of whether the message is a command message originating from the master controller or a reply message originating from one of the slave devices.

The reply message 42 is shown in FIG. 3 according to one example, and likewise includes 8-bits $b_0$–$b_7$ and a parity bit p. In addition, the reply message 42 may include a conventional start bit (not shown) at the beginning of the reply message and a conventional stop bit (not shown) at the end of the reply message. Bits $b_0$–$b_7$ are available for use to communicate the reply information, while parity bit p serves to provide a direction indicator as to whether the message is a command message originating at the master controller 14 or a reply message originating at one of the slave devices 18a–18n. Reply information may include status and fault information about the load device associated with the slave device. By employing the parity bit p as a direction indicator, the reply message 42 does not require address bits since all other slave devices will identify a reply message based on the parity and ignore the reply message. Therefore, the reply message has more data-bits available for use for the reply information.

Referring to FIGS. 4 and 5, the communication of command and reply messages between the master controller 14 and each of the slave devices 18a–18n is shown therein. Referring to FIG. 4, the master controller 14 sends a command message with an odd parity indicative that the message is a command message originating at the master controller 14. Each of slave devices 18a–18n check the parity to determine whether the parity is odd and therefore indicative of a command message. If the parity is odd, the slave devices 18a–18n each read and determine whether the particular slave device is addressed by the command message. The slave device that is addressed then performs the designated control operation according to the command message.

After performing the commanded control operation, the slave device generates a reply message for transmission as shown in FIG. 5. The slave device 18n is shown providing a reply message with an even parity that is broadcast onto data bus 16. Each of the other remaining slave devices 18a, 18b, etc., as well as the master controller 14, checks the parity of the reply message. If the other slave devices determine the parity is even, which is indicative of the reply message, each of those slave devices ignores the message. However, the master controller 14 reads the reply message, and may record the reply information.

With particular reference to FIG. 6, a methodology 50 for performing data communication between a master controller and a plurality of slave devices is illustrated therein. Methodology 50 begins with step 52 in which the master controller receives or generates a control signal for performing a desired operation. In step 54, the master controller generates an 8-bit message with address information designating a particular slave device. In step 56, methodology 50 loads the 8-bit message into the master controller transmit buffer. In step 58, the parity bit is added to the command message so that the accumulated bits in the command message are odd. The odd parity is indicative of a command message. In step 60, the command message is broadcast on the data communication network to each of the slave devices.

Proceeding to step 62, each of the slave devices receives the broadcast message in the receive buffer and determines whether the parity is odd or even. Decision block 64 checks for whether the parity is odd or even. If the parity is even, the master controller reads and decodes the message in step 68 and returns to step 52. If the parity is odd, which is indicative of a command message, methodology 50 proceeds to step 66 in which each of the slave devices reads and decodes the message. Next, in step 70, each slave device checks for whether the address in the decoded message is correct i.e., matches the address for that slave device. If the address for the corresponding slave device is not correct, that slave device ignores the message and clears its receive buffer in step 72. However, if the address is correct, that particular slave device performs the commanded operation as indicated in the command message according to step 74.

Once the commanded operation is performed in step 74, the addressed slave device prepares a reply message with status and fault information in step 76. In step 78, the addressed slave device loads the reply message into its transmit buffer. In step 80, the parity bit is added to the reply message so that the accumulated bits in the message are even, which is indicative of a reply message. The slave device then broadcasts the reply message on the network in step 82, and thereafter returns to step 62. While the direction indicating parity bit described herein provides an odd parity for command messages and an even parity for reply messages, it should be appreciated that the parity could be designated otherwise.

Accordingly, the master/slave control system 12 and methodology 50 provide for enhanced control message communication between a master controller 14 and a plurality of slave devices 18a–18n, that is particularly well suited for use in a vehicle 10. The system 12 and method 50 allow for reduction of the reply message size, faster system response, and more efficient utilization of the signal bandwidth, while providing message validation.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A master/slave control system comprising:
   a data communication bus for communicating data messages between electronic devices;
   a plurality of slave devices coupled in data communication to said data communication bus, said plurality of slave devices being addressable and capable of reading messages from said data communication bus and writing messages to the data communication bus; and
   a master controller coupled in data communication to said data communication bus for broadcasting command messages on said data communication bus, wherein said command messages include an address message for addressing at least one of said plurality of slave devices and a command direction indicator parity bit for identifying the command message, wherein said addressed slave device produces a reply message which includes a reply direction indicator parity bit for identifying the reply message.

2. The system as defined in claim 1, wherein each of said plurality of slave devices comprises a receive buffer for receiving broadcast command messages and determining either odd or even parity so as to determine whether a message is a command message or a reply message.

3. The system as defined in claim 1, wherein said master/slave control system is located in a vehicle.

4. The system as defined in claim 1, wherein said data communication bus comprises a serial data bus.

5. The system as defined in claim 1, wherein said master controller includes a digital processor.

6. The system as defined in claim 1, wherein at least one of said plurality of slave devices comprises an application specific integrated circuit.

7. The system as defined in claim 1, wherein each of said slave devices are further coupled to load device for performing a command operation.

8. The system as defined in claim 1, wherein said command direction indicator parity bit provides an odd parity, and said reply direction indicator parity bit provides an even parity.

9. A method of communicating command and reply messages between a master controller and slave devices, said method comprising the steps of:
   generating a command message with a master controller, said command message including an address for addressing at least one of a plurality of slave devices;
   attaching a command direction indicator parity bit to said command message so that the parity of the command message indicates that the message is a command message;
   broadcasting the command message on a data communication bus so that the command message is made available to a plurality of slave devices;
   receiving the broadcast command message with each of said plurality of slave devices and determining the parity thereof;
   decoding the command message with each of the plurality of slave devices if the parity is a command direction indicator parity indicative of a command message;
   determining which slave device is addressed;
   performing an operation according to the command message for the addressed slave device;
   producing a reply message with the addressed slave device;
   attaching a reply direction indicator parity bit to the reply message so that the parity indicates that the message is a reply message; and
   broadcasting the reply message on the data communication bus.

10. The method as defined in claim 9 further comprising the step of reading said reply message with said master controller and decoding the reply message when the parity indicates the message is a reply message.

11. The method as defined in claim 9, wherein said method communicates the command and reply messages between a master controller and slave devices in a vehicle.

12. The method as defined in claim 9 further comprising the step of ignoring said reply message with each of said plurality of slave devices when said parity indicates the message is a reply message.

13. The method as defined in claim 9, wherein said step of decoding the command message comprises decoding the command message only if said parity indicates a command message.

14. The method as defined in claim 9, wherein said step of broadcasting comprise serial data broadcasting.

15. A method of communicating command and reply messages between a master controller and slave devices, said method comprising the steps of:

generating a command message with a master controller for controlling at least one slave device, said command message including an address message for addressing said at least one slave device and a parity bit identifying the message as a command message;

broadcasting said command message on a data communication bus to a plurality of slave devices;

reading and decoding said command message with said plurality of slave devices only upon detecting a parity indicative of a command message;

determining which slave device is addressed;

performing an operation based on said command message by said addressed slave device;

producing a reply message with said addressed slave device, said reply message including a reply parity indicating that the message is a reply message; and broadcasting the reply message on the data communication bus.

16. The method as defined in claim 15 further comprising the step of reading the broadcast reply message with the master controller if the parity is indicative of a reply message.

17. The method as defined in claim 15, wherein said method communicates the command and reply messages between a master controller and slave devices in a vehicle.

18. The method as defined in claim 15 further comprising the step of ignoring said reply message with each of said plurality of slave devices when said parity indicates the message is a reply message.

19. The method as defined in claim 15, wherein said reply message does not contain the address of the addressed slave device.

* * * * *